United States Patent [19]
Kieffer et al.

[11] Patent Number: 5,727,371
[45] Date of Patent: Mar. 17, 1998

[54] AGRICULTURAL MACHINE USED FOR CUTTING VEGETABLES WITH AN IMPROVED PROTECTION DEVICE

[75] Inventors: Fernand Kieffer; Horst Neuerburg, both of Saverne; Jean-Paul Haberkorn, Monswiller, all of France

[73] Assignee: Kuhn S.A., Saverne Cedex, France

[21] Appl. No.: 549,066

[22] Filed: Oct. 27, 1995

[30] Foreign Application Priority Data

Oct. 28, 1994 [FR] France ................. 94 13106

[51] Int. Cl.$^6$ ..................... A01D 34/66; A01D 34/82
[52] U.S. Cl. ................. 56/6; 56/10.2 R; 56/DIG. 15; 56/DIG. 20
[58] Field of Search ................. 56/6, 17.4, 320.1, 56/320.2, 10.2 R, DIG. 15, DIG. 20, 16.4 R

[56] References Cited

U.S. PATENT DOCUMENTS

| | | |
|---|---|---|
| 3,783,533 | 1/1974 | König et al. .................. 56/6 |
| 5,203,150 | 4/1993 | Ryken et al. .................. 56/16.3 |
| 5,566,537 | 10/1996 | Kieffer et al. |

FOREIGN PATENT DOCUMENTS

| | | |
|---|---|---|
| 0 514 314 A1 | 4/1992 | Denmark. |
| 27 22 883 | 5/1977 | France. |
| 0 402 957 A2 | 7/1986 | France. |
| 0 558 431 A1 | 2/1993 | France. |
| 1 582 356 | 10/1967 | Germany. |
| 0 083 460 A1 | 12/1982 | Netherlands. |
| 0 507 408 A1 | 4/1992 | Netherlands. |

*Primary Examiner*—Terry Lee Melius
*Attorney, Agent, or Firm*—Oblon, Spivak, McClelland, Maier & Neustadt, P.C.

[57] ABSTRACT

The invention includes a stop (33) which prevents movement of the part (23) of the protection device (18) into the non-operating position when the cutting mechanism (2) is located in the work position (A), and which allows movement when the cutting mechanism (2) is located in a different position (B), the activation of the stop (33) being accomplished automatically by means of an activation element (35) when the cutting mechanism (2) is brought from the other position (B) into the work position (A). The invention also includes a limiting element (52) for limiting the amount of pivoting between a support arm (5) and the cutting mechanism (2) in work position (A) and preventing pivoting when the cutting mechanism (2) is in the other position (B). The invention also includes a signalling plate (50) and the activation elements (47)(35) to move the signalling plate (50) to an operative position when the cutting mechanism (2) is moved to position (B) and to an inoperative position when the cutting mechanism is in work position (A).

30 Claims, 10 Drawing Sheets

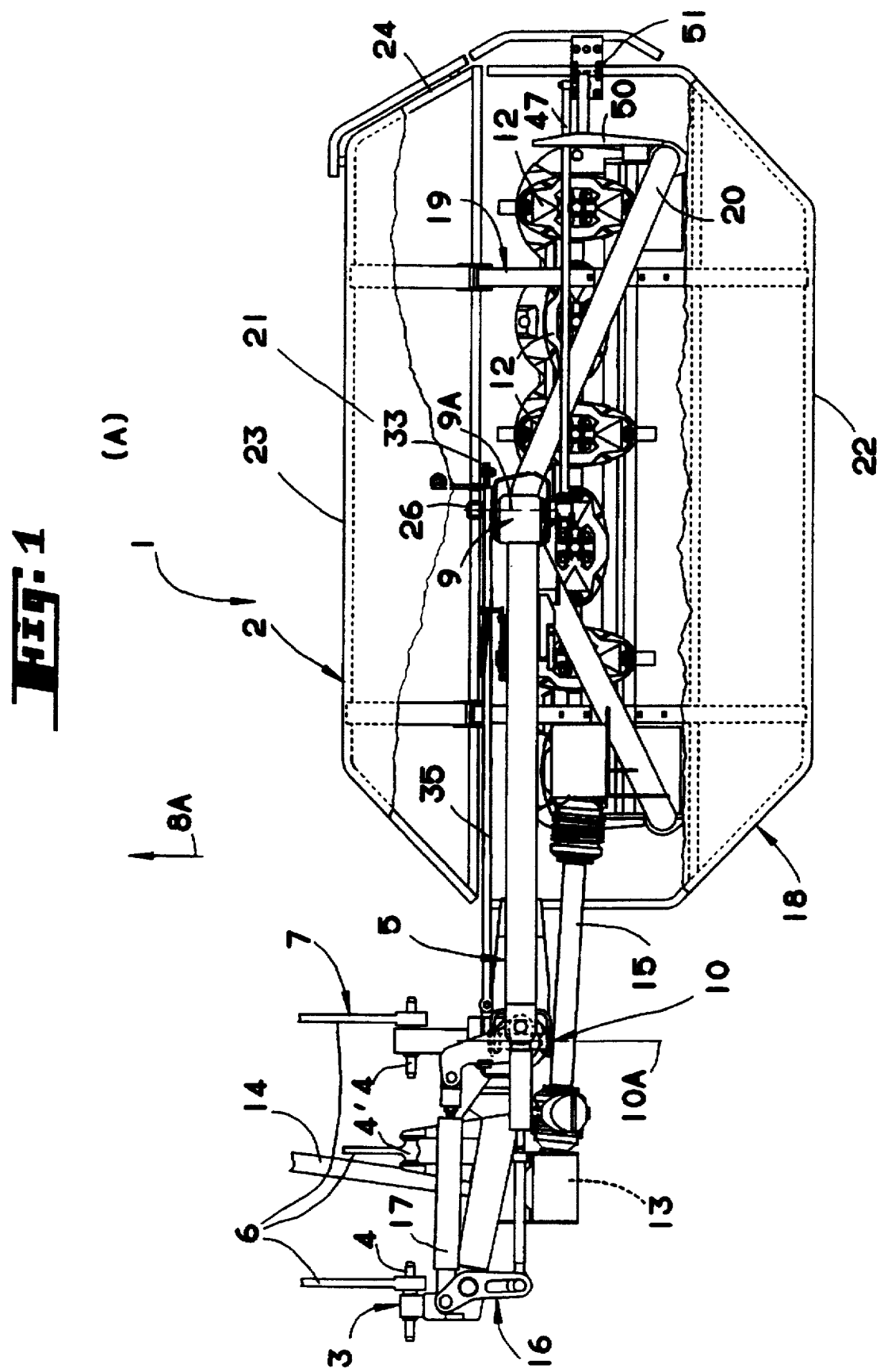

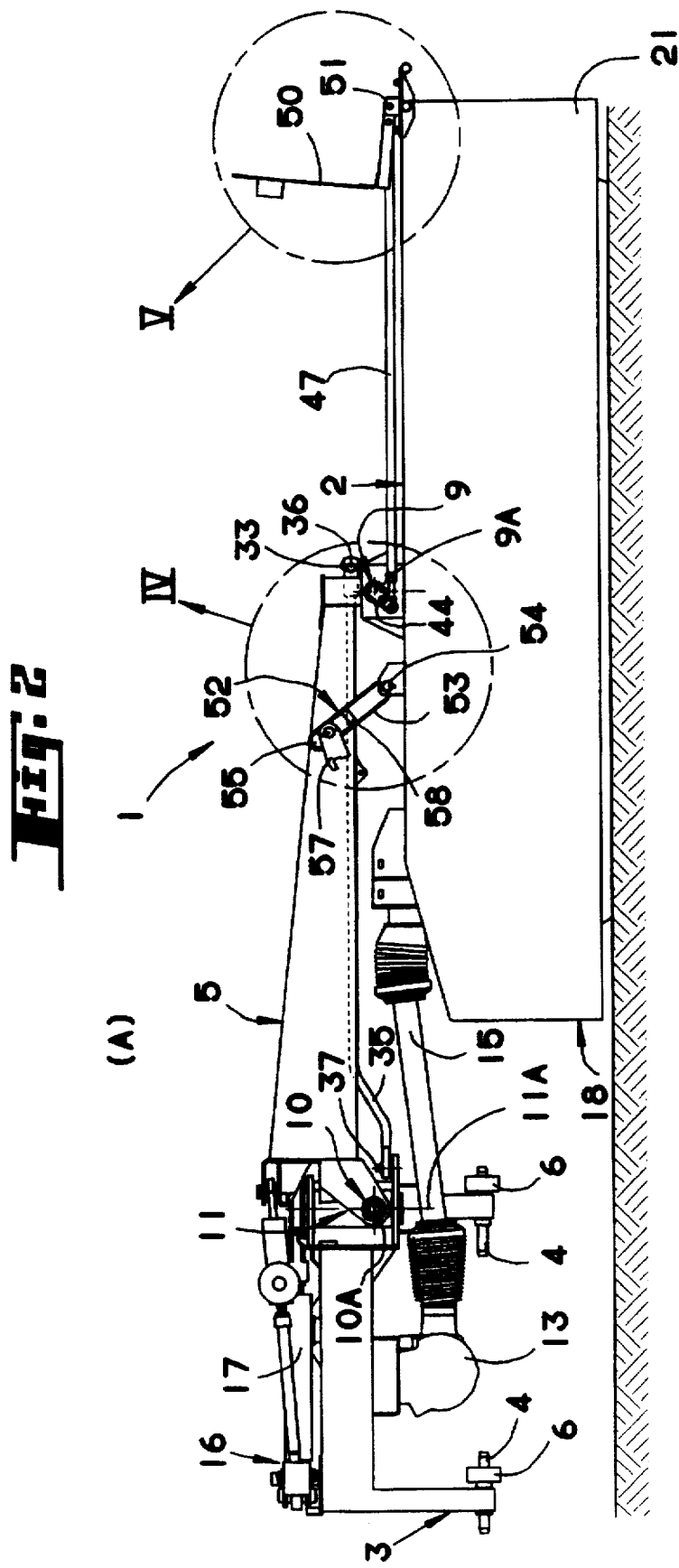

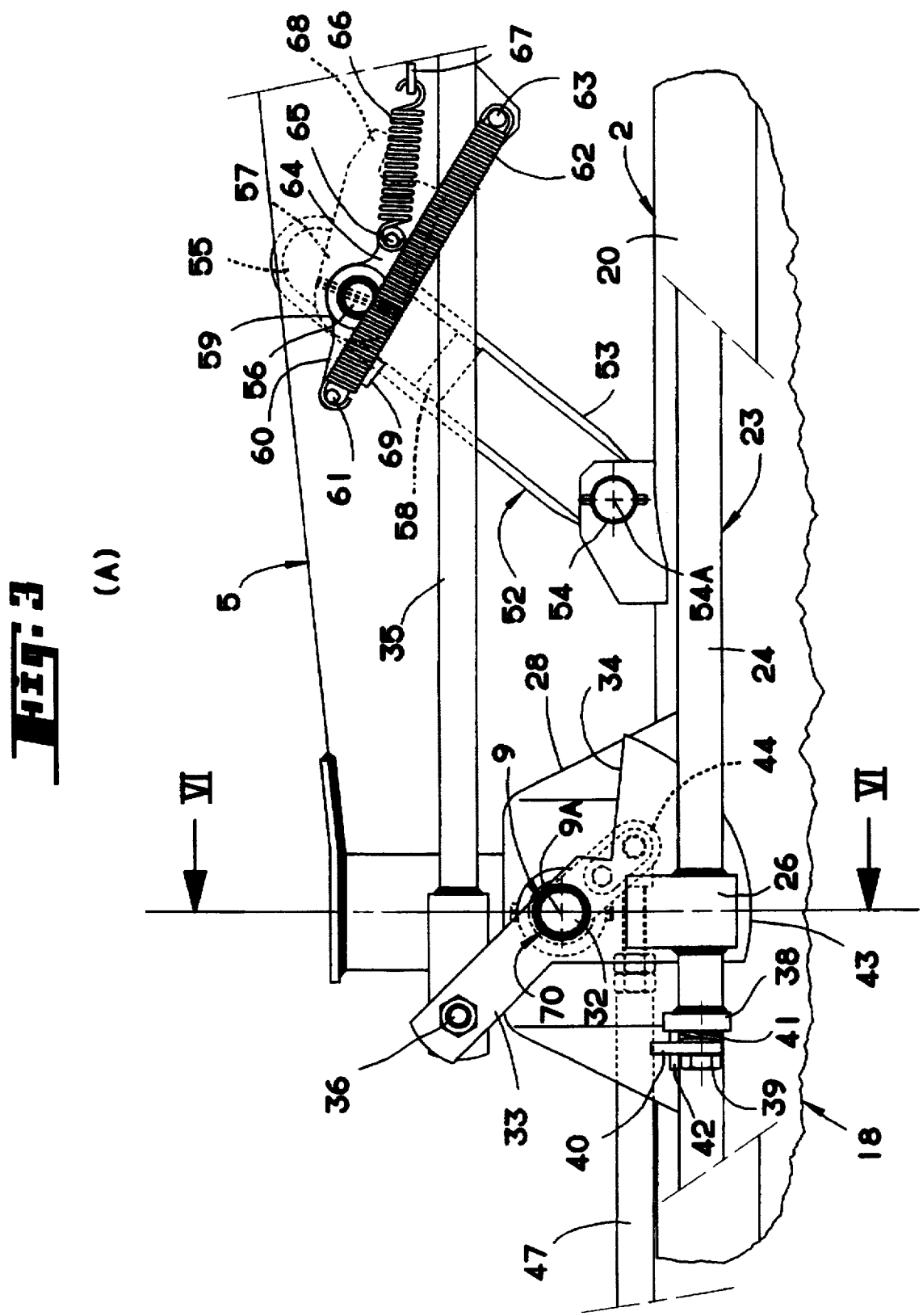

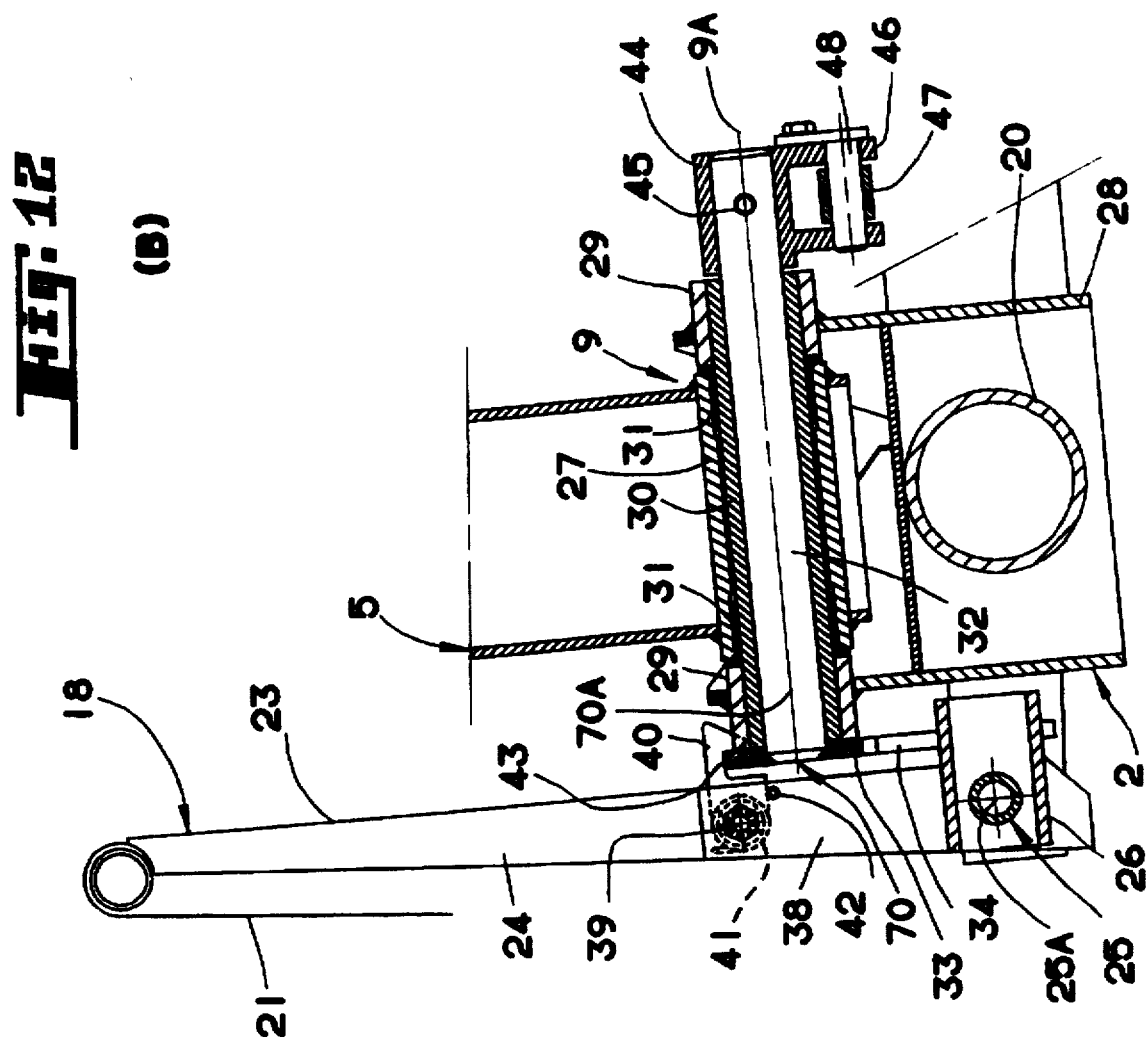

AGRICULTURAL MACHINE USED FOR CUTTING VEGETABLES WITH AN IMPROVED PROTECTION DEVICE

BACKGROUND OF THE INVENTION

1. Field of the Invention

This invention relates to an agricultural machine used for cutting vegetables. Such an agricultural machine can include an attachment structure to be connected to a drive vehicle, and a cutting mechanism which is attached directly or indirectly to the attachment structure by means of an articulation (i.e., a pivot connection) so that the cutting mechanism can be brought into a work position in which it extends transversely to the direction of travel, or in a different position. The cutting mechanism can include cutting elements and a protection device which envelops the latter and of which one part can be moved to a non-operational position. Drive elements can be used which are capable of driving the cutting elements when the cutting mechanism is in the work position and which are incapable of providing drive power to the cutting elements when the cutting mechanism is in the other position.

2. Discussion of the Background

A known agricultural machine, made in the form of a mower-conditioner, includes a cutting mechanism provided with cutting elements which are used to cut vegetables and a conditioning mechanism provided with conditioning elements which are used to subject the cut vegetables to a treatment with the goal of accelerating their drying. The cutting elements are comprised of disks. The disks turn at high speed in an approximately horizontal plane, and they are provided with articulated blades.

The known mower-conditioner is intended to be attached to a rear three points lifting device of a farm tractor. It includes a suitable attachment structure for this purpose.

The known cutting and conditioning mechanism is connected to the attachment structure by means of a support beam which extends, during operation, at least approximately orthogonally to the direction of travel. The support beam is connected on the one hand to the attachment structure by means of an articulation with an at least approximately vertical axis and on the other hand to the cutting and conditioning mechanism by means of an articulation with an axis directed at least approximately along the direction of travel when the cutting and conditioning mechanism is in its operating position. When seen from above this last articulation extends at least approximately into the middle part of the cutting and conditioning mechanism, thereby permitting the latter to follow the ground terrain during operation. The first articulation, for its part, allows the cutting and conditioning mechanism to be positioned in the work position in which it extends transversely to the direction of travel, or in the transport position in which it extends at least approximately parallel to the direction of travel.

The known mower-conditioner also includes drive elements which provide actuation of the cutting elements and conditioning elements of the cutting and conditioning mechanism. These drive elements include a gear box connected to the attachment structure, a first universal joint transmission shaft which transmits movement of the power take-off of the agricultural tractor to said gear box, and a second transmission shaft which transmits movement from the gear box to an entry case of the cutting and conditioning mechanism. These drive elements are perfectly capable of driving the cutting elements and the conditioning elements when the cutting and conditioning mechanism is located in the work position. However, they are incapable of providing drive power for the cutting elements and the conditioning elements when the cutting and conditioning mechanism is in the transport position. That is because in the transport position the angles of the universal joints of the two transmission shafts are then too great.

The cutting and conditioning mechanism of the known mower-conditioner also includes a protection device which envelops the cutting elements. This protection device will avoid corporal accidents (i.e., serious injuries) on the one hand by preventing projection, by the cutting elements, of objects such as stones, for example, and on the other hand by prohibiting unforeseen or inadvertent access to the cutting elements. In any case, during maintenance work (replacing blades and/or disks which are worn out or have become particularly degraded) it is necessary to have easy access to said cutting elements. For this purpose, the protection device of the known mower-conditioner includes a flap which can be pivoted upward when the cutting and conditioning mechanism is located in the transport position as well as when it is located in the work position. Although the liftable flap easily facilitates the work of replacing the worn out or degraded disks or blades, it nevertheless constitutes a danger. Indeed, when the disks and blades are changed while the cutting and conditioning mechanism is located in the work position, the cutting elements could be accidentally actuated because in that position the drive elements are perfectly capable of transmitting movement. The operator who is in the process of replacing the disks or blades could then be subjected to extremely serious, even fatal, injuries. Moreover, the flap could also be raised unexpectedly or involuntarily when the cutting elements are turning thereby subjecting the operator or others to possible grave injuries.

SUMMARY OF THE INVENTION

One object of this invention is to provide a remedy for the above-stated problem. For this purpose the agricultural machine which is to be used for cutting vegetables according to the present invention is characterized in that it additionally includes a stop device which prevents movement of the part of the protection device into non-operational position when the cutting mechanism is in the work position, and which authorizes movement thereof when said cutting mechanism is in the other position. The engagement of the stop being automatically achieved by means of an activation element when the cutting mechanism is brought from said other position into the work position. In the agricultural machine intended for cutting vegetables according to this invention it is therefore provided that one pan of the protection device which envelops the cutting elements can be displaced in order to provide access easily to said cutting elements in order to inspect them and/or replace them. However, the movement of said pan of the protection device is only possible when the cutting mechanism is found in a position other than the work position and in which the drive elements of the cutting elements are not capable of providing power for the latter. Therefore there is no risk that said cutting elements will accidentally be caused to move during replacement of the worn out or degraded cutting elements. When the cutting mechanism is in the work position the stop will prevent unexpected or involuntary movement of said part of the protection device. In the agricultural machine used for cutting of vegetables according to this invention, it is also provided that the actuation of the stop is done automatically by means of an activation element when the cutting mechanism is brought from said other position into the work position. The implementation of the stop therefore requires no particular intervention on the part of the user of the agricultural machine, which also constitutes a risk eliminating factor. The activation element which is to effect the stop is preferably comprised of a rod which is articulated between the attachment structure and the stop.

It is a further object of the present invention that the activation element also automatically controls the retraction of the stop when the cutting mechanism is brought from the work position into said other position. This facilitates use of the agricultural machine.

Another object of the present invention is to provide a holding element that will hold the part of the protection device in its non-operating position. The action of that holding element being automatically neutralized when the cutting mechanism is moved from said other position into the work position. The holding element further facilitates use of said agricultural machine since said part of the protection device will automatically return to its operating position whether in a forced manner, or due to the effect of its own weight. In a preferable embodiment of the present invention the holding element will work together with the stop when the cutting mechanism is located in said other position. The return of the stop to its active position will then automatically free the holding element whose action will then be neutralized.

In a preferred embodiment, the stop is connected directly or indirectly to the cutting mechanism and moved together with the cutting mechanism when the latter is moved between the work position and the other position. Preferably this connection is comprised of an articulation (second articulation) whose axis is directed toward the front when the cutting mechanism is located in the work position.

In the embodiments in which the cutting mechanism is connected to the attachment structure by means of a support beam connected on the one hand to the cutting mechanism by means of an articulation with an axis directed toward the front when the cutting mechanism is located in work position (third articulation), and on the other hand to the attachment structure by means of the first articulation, the axis of the second articulation (connecting the stop to the cutting mechanism) and the axis of this third articulation will be coaxial advantageously. In a preferred embodiment, the axis of the second articulation and/or the axis of the third articulation are directed at least approximately along the direction of travel when the cutting mechanism is located in the work position.

The part of the protection device which can be moved is advantageously a flap that can be pivoted about a pivot axis. Preferably the latter extends, in the work position of the cutting mechanism, at least approximately horizontally and transversely to the direction of travel.

In the case in which the stop is connected to the cutting mechanism by means of the second articulation, the pivot axis extends preferably at least approximately orthogonally to the axis of this second articulation.

It also is advantageously provided that the part of the protection device which is capable of being moved is located at the front of the protection device when the cutting mechanism is located in the work position.

According to another object of the invention, a signalling plate is provided that is connected directly or indirectly to the cutting mechanism and is moved automatically by means of an activation element (second activation element) into an operational position (signalling position) when the cutting mechanism is placed in a transport position, and is moved into a non-operating position in which it does not disturb the cutting of the vegetables when the cutting mechanism is moved into its work position.

Moreover, advantageously a coupling means connects the second activation element to the first activation element. The action of the first activation element on the stop then simultaneously causes an action on the second activation element.

As was stated previously, the stop is connected directly or indirectly to the cutting mechanism. In this case, the second articulation can include a swivel pin. The stop is attached to one end of the swivel pin and an arm is attached at the other end thereof. The second activation element is comprised of a rod articulated between the said arm and a carrier arm of the signalling plate. The swivel pin provided with the stop and the arm thus constitutes the means of coupling. It is also provided that the length of said rod is adjustable which allows the operational position of the signalling plate to be controlled exactly. The connection (direct or indirect) of the signalling plate to the cutting mechanism is advantageously comprised of an articulation (fourth articulation). The signalling plate is then moved into the operating position and into the non-operating position by pivoting about the axis of the fourth articulation. The axis of the fourth articulation is directed toward the front when the cutting mechanism is located in the work position. In the case in which the stop is connected directly or indirectly to the cutting mechanism by means of the second articulation, the axis of the fourth articulation preferably is at least approximately parallel to the axis of this second articulation.

In the embodiments in which the axis of the first articulation is directed upward and in which the other position which the cutting mechanism can occupy is a transport position, the signalling plate is advantageously provided on the outer end of the cutting mechanism away from the attachment structure.

In the embodiments in which the cutting mechanism is connected to the attachment structure by means of a support beam connected on the one hand to the cutting mechanism by means of a third articulation with its axis directed toward the front when the cutting mechanism is in the work position, and on the other hand to the attachment structure by means of the first articulation, a limiting element is provided which operates between the cutting mechanism and the support beam. The limiting element limits pivoting of the cutting mechanism with respect to the support beam about the axis of the third articulation during operation and locks the said pivoting during transport. Locking and unlocking respectively of the said pivoting is implemented automatically by means of a third activation element when the cutting mechanism is moved into a transport position, or into the work position, respectively.

Advantageously the third activation element is connected to one of the preceding activation elements, preferably to the first activation element, so that an action on said activation element simultaneously causes an action on the third activation element.

The limiting element includes a limiter with an elongated opening and a lock connected to the support beam by means of an articulation (fifth articulation) which is made of a swivel pin that simultaneously crosses the elongated opening of the limiter of said limiting element. The axis of this fifth articulation is preferably at least approximately parallel to the direction of travel when the cutting mechanism is located in work position.

Moreover, the third activation element includes two elastically deformable elements of which one ensures implementation of said lock while the other ensures neutralization of the latter.

BRIEF DESCRIPTION OF THE DRAWINGS

Other characteristics and advantages of the present invention will be apparent from the following description of one example of non-limiting implementation which is given with reference to the attached drawing in which:

FIG. 1 represents a top view of an agricultural machine which is to be used for cutting vegetables according to the invention made in the form of a mower; the latter is in the working position;

FIG. 2 represents a rear view of the mower in working position;

FIG. 3 represents, on a larger scale, a front view of the connection between the cutting mechanism and the support beam of the mower in working position;

FIG. 12 represents a sectional view along plane XII defined in FIG. 9.

DESCRIPTION OF THE PREFERRED EMBODIMENT

Figure 5:
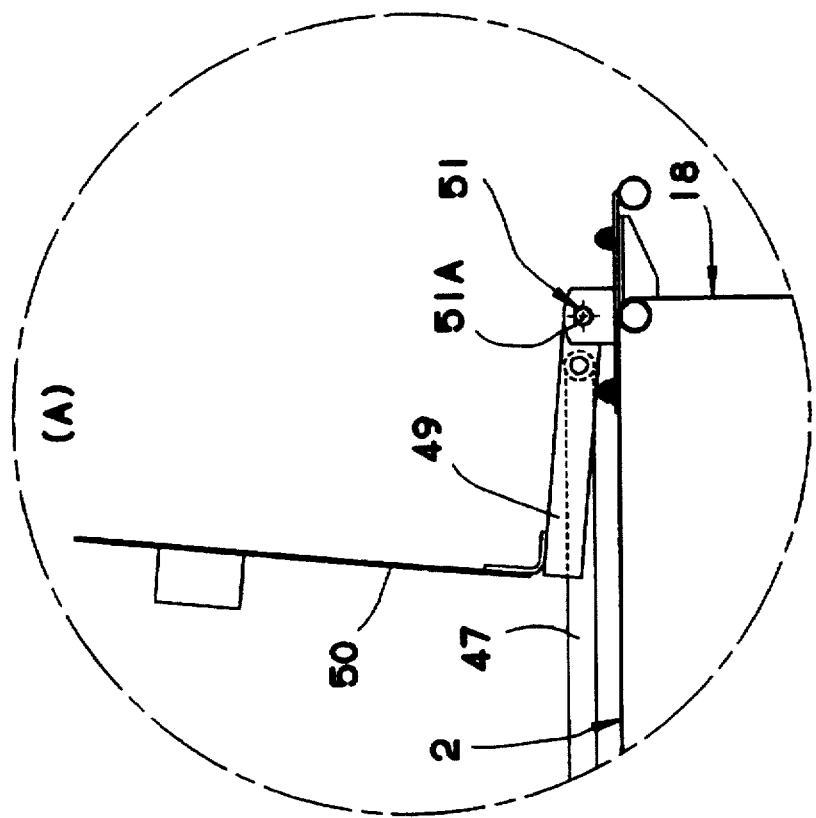
FIG. 5 represents, on a larger scale, area V of FIG. 2.
Figure 4:
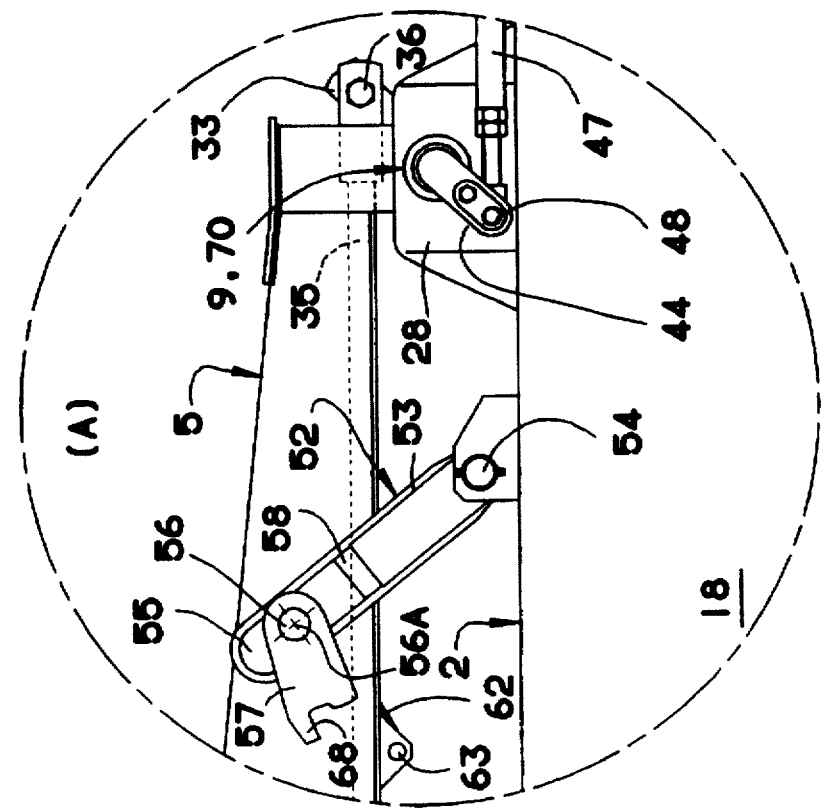
FIG. 4 represents, on a larger scale, area IV of FIG. 2.

The mower (1) as represented on the different figures conforms to the one described in patent application Ser. No. 08/432,066 presently accorded a filing date of May 1, 1995 now U.S. Pat. No. 5,566,537 issued Oct. 22, 1996. The description which follows then pertains essentially to the object of this invention. For all other details one should refer, if necessary, to the text of said patent application, which is hereby incorporated herein by reference.

The mower (1), in conformity with the present invention, includes a cutting mechanism (2), an attachment structure (3) with three points of attachment (4, 4') and a support beam (5) which connects the cutting mechanism (2) to the attachment structure (3).

During operation, the mower (1) is connected, by means of the attachment structure (3), to the three points lifting device (6) of an agricultural tractor (7) (only the lifting device (6) of the latter has been shown) so that the cutting mechanism (2) extends, looking along a work direction (8A), laterally on the side of the path of said agricultural tractor (7) and transversely to the work direction (8A) (in the example shown, the cutting mechanism (2) extends at least approximately orthogonally to the work direction (8A)). This is the work position (A).

The cutting mechanism (2) will not be described in detail: it can indeed be any type of cutting mechanism whatsoever (in the example shown here it is a cutting mechanism commonly called "disk cutting mechanism").

The cutting mechanism (2) is connected to the support beam (5) by means of an articulation (9) of the pivot type with an axis (9A) directed forward when the cutting mechanism (2) is in working position (A) (in the example shown here the axis (9A) is at least approximately directed along the work direction (8A)). The articulation (9) extends, moreover, almost in the vertical plane directed along the direction of operation (8A), containing the center of mass of the cutting mechanism (2). It extends, moreover, at the upper part of the cutting mechanism (2) and allows the latter to pivot at a certain angle with respect to the support beam (5) in a plane which is orthogonal to the axis (9A) of said articulation (9).

The support beam (5) is connected to the attachment structure (3) by means of an articulation (10) and an articulation (11) so that this latter articulation allows pivoting of the articulation (10) together with the support beam (5) with respect to the attachment structure (3). The articulation (10) is an articulation of the pivot type with an axis (10A) directed forward when the cutting mechanism (2) is in the working position (A) (in the example shown here the axis (10A) is at least approximately directed along the work direction (8A)). In the view along the work direction (8A) it appears, moreover, that the articulation (10) extends at least approximately at the same level with respect to the ground as articulation (9). The articulation (11) is also an articulation of the pivot type but with an axis (11A) directed upward (in the example shown here the axis (11A) is at least approximately vertical). Moreover it appears that the axis (10A) of articulation (10) and the axis (11A) of articulation (11) are at least approximately intersecting (secant). The articulation (9) and articulation (10) allow the cutting mechanism (2) to follow the ground relief during cutting.

Activation of the cutting elements (12) of the cutting mechanism (2) is implemented by a drive source which is, in the example shown here, comprised of the power take-off (not shown) of the agricultural tractor (7). One could, however, envisage all other possible drive sources. The latter transmits movement to a gear box (13) by means of a first telescoping transmission shaft (14) with universal joints. The gear box (13) is attached to the attachment structure (3) and extends, looking along the work direction (8A), between the two lower attachment points (4) of said attachment structure (3). This gear box (13) itself transmits movement to the cutting elements (12) of the cutting mechanism (2) by means of a second telescoping transmission shaft (15) with universal joints, which extends transversely to the direction of work (8A) when the cutting mechanism (2) is in the work position (A). Moreover, the articulation (10) and the articulation (11) extend in the vicinity of and somewhat higher than the universal joint of the telescoping transmission shaft (15) located at the side of the gear box (13).

The mower (1) also includes a safety device (16). The safety device (16) holds the cutting mechanism (2) in its working position (A), but allows pivoting of the cutting mechanism, together with the support beam (5), toward the rear about the axis (11A) of articulation (11) in case the cutting mechanism (2) encounters an obstacle that is located in the field during operation.

The safety device (16) will not be described in detail; if necessary one can refer to the description which is given in the U.S. Pat. No. 5,566,537 which is hereby incorporated herein by reference.

It suffices simply to indicate that the safety device (16) includes a maneuvering element (17) which is used, among other things, to pivot the cutting mechanism (2) together with the support beam (5) toward the rear until reaching the transport position (B) shown in FIGS. 7 to 12. In this position the cutting mechanism (2) and the support beam (5) are located behind the agricultural tractor (7) in the continuation of the latter. In this position one will note, moreover, that the telescoping transmission shaft (15) with universal joints extends essentially along the direction (8B) of movement during transport and that its universal joint, located on the side of the gear box (13), has an angle so great that the transmission shaft (15) is not capable of transmitting movement to the cutting elements (12) of the cutting mechanism (2).

In the example shown here, the maneuvering element (17) is comprised of a double action hydraulic jack whose activation can, for example, be provided by a hydraulic power source (not shown here) such as the hydraulic power plant of the agricultural tractor (7).

The cutting mechanism (2) also includes a protection device (18) which surrounds the cutting elements (12). This protection device (18) is used to avoid bodily injury by preventing unforeseen access to the cutting elements (12) and, according to the nature of the cutting elements (12), by preventing the projection of objects such as stones, for example.

This protection device (18) is comprised of a framework (19) connected to a support element (20) of the cutting mechanism (2) and a canvas sheet (21) wrapped tight to said framework (19) and secured to it. It includes a fixed rear part (22) and a movable front part (23). The movable front part (23) is made in the form of a flap (24) which is connected indirectly to the support element (20) by means of an articulation (25) (FIGS. 6 and 12) whose pivoting axis (25A) extends at least approximately horizontally and at least approximately orthogonally to the work direction (8A) when the cutting mechanism (2) is in the work position (A). The from part (23) of the protection device (18) can thus be pivoted upward (FIG. 12) about the pivot axis (25A) in order to provide easy access, particularly to the cutting elements (12) of the cutting mechanism (2), in order to inspect their condition and, if necessary, to replace them. In the vicinity of articulation (9), which connects the cutting mechanism (2) to the support beam (5), the flap (24) additionally includes a resting member (26).

Figure 6:
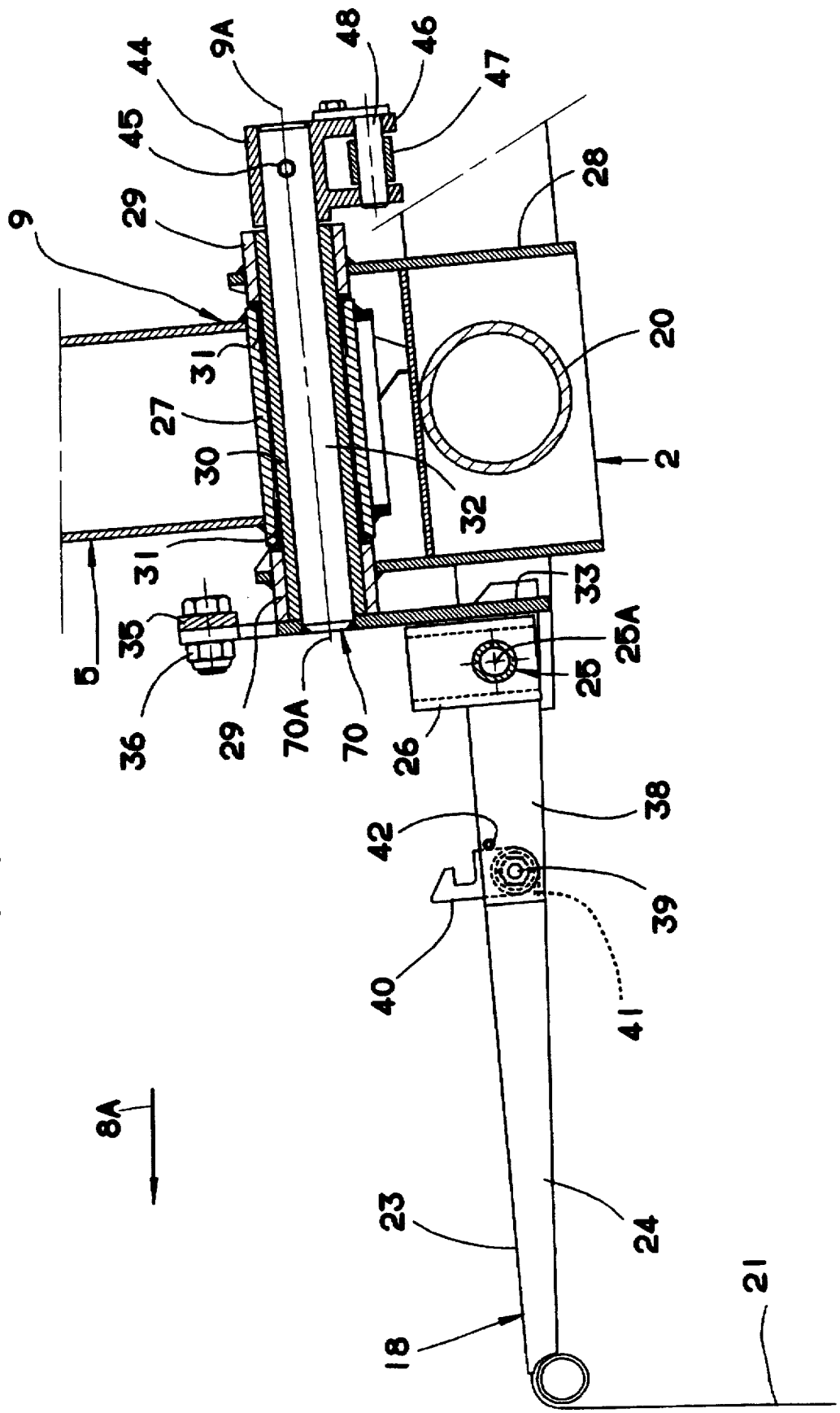
FIG. 6 represents a sectional view along plane VI defined in FIG. 3.
Figure 7:
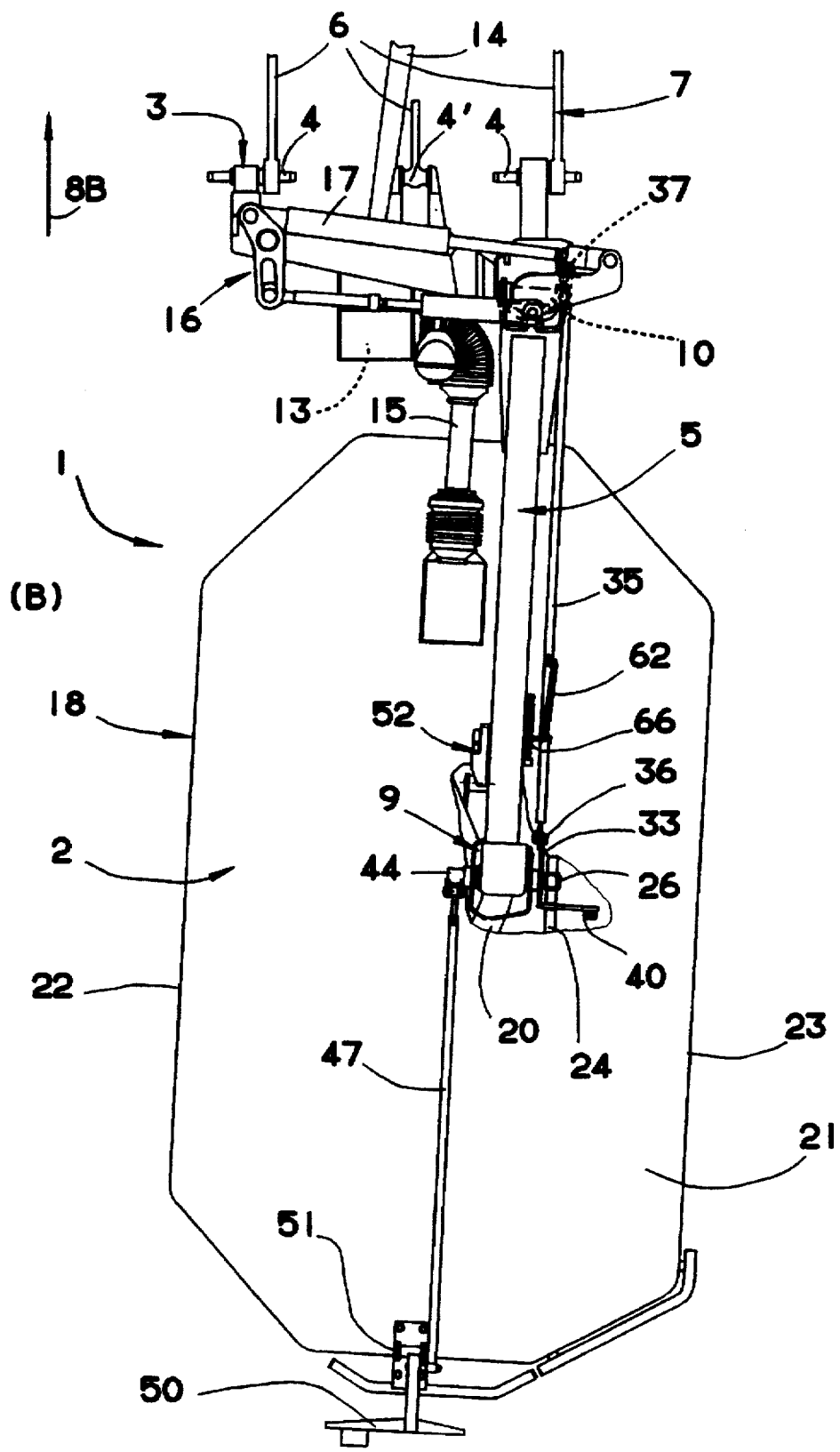
FIG. 7 represents a view from above of the mower of FIG. 1 placed in transport position.
Figure 8:
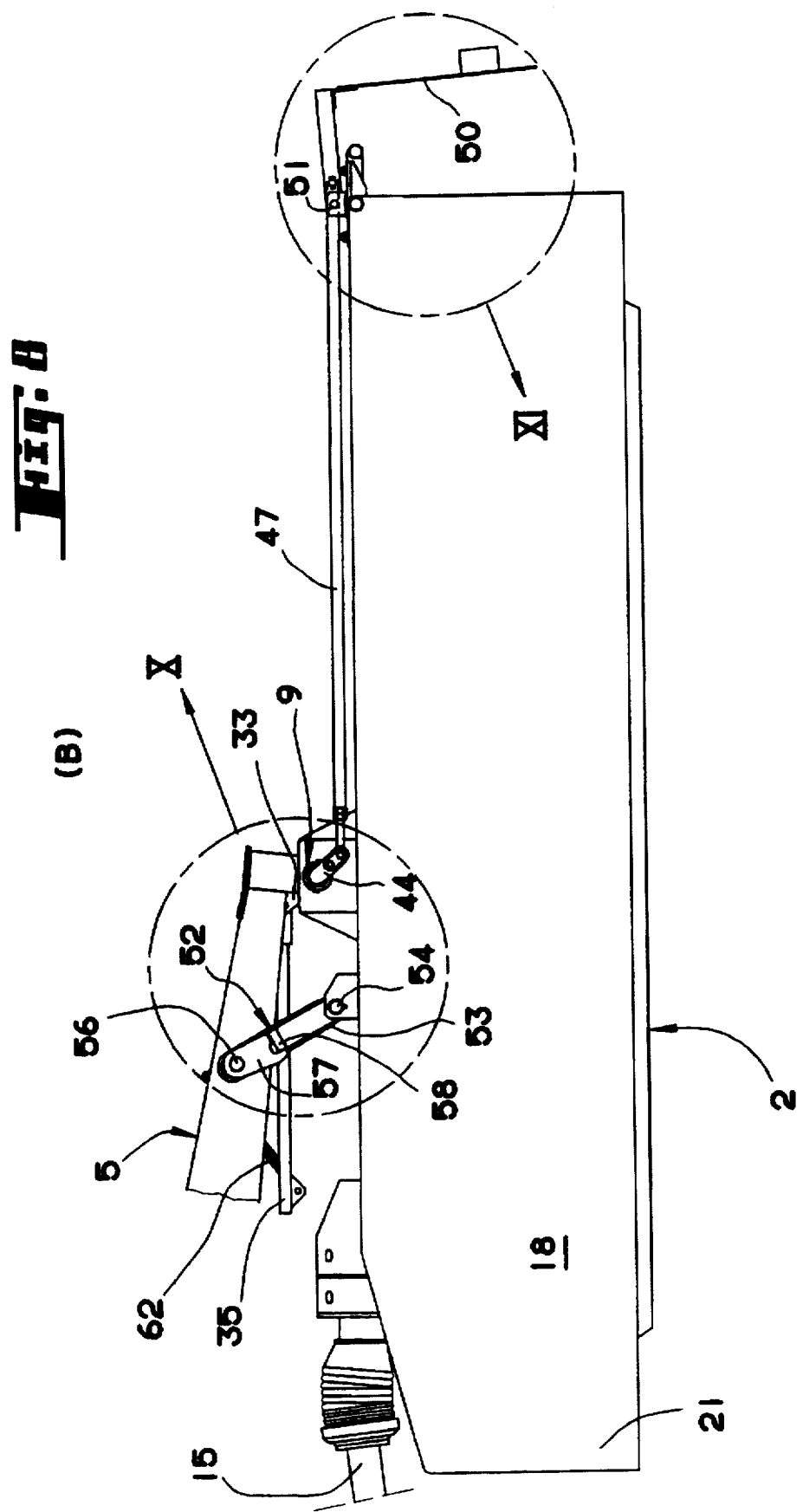
FIG. 8 represents a partial rear view of the mower in transport position.

The articulation (9) appears in detail in FIGS. 6 and 12. The support beam (5) is provided with a sleeve element (27) at its outer end. The support element (20) of the cutting mechanism (2) has a yoke (28) in each of the flanges of which a respective sleeve (29) has been soldered on. A hollow shaft (30) is inserted in the two sleeves (29) and is guided in its rotation in the sleeve element (27) by means of two rings (31).

The cylinder bore of the hollow shaft (30) is traversed by a swivel pin (32) whose longitudinal axis is coaxial with the axis (9A) of the articulation (9). The swivel pin (32) is provided with a stop (33) on the side of the flap (24) of the protection device (18).

Figure 9:
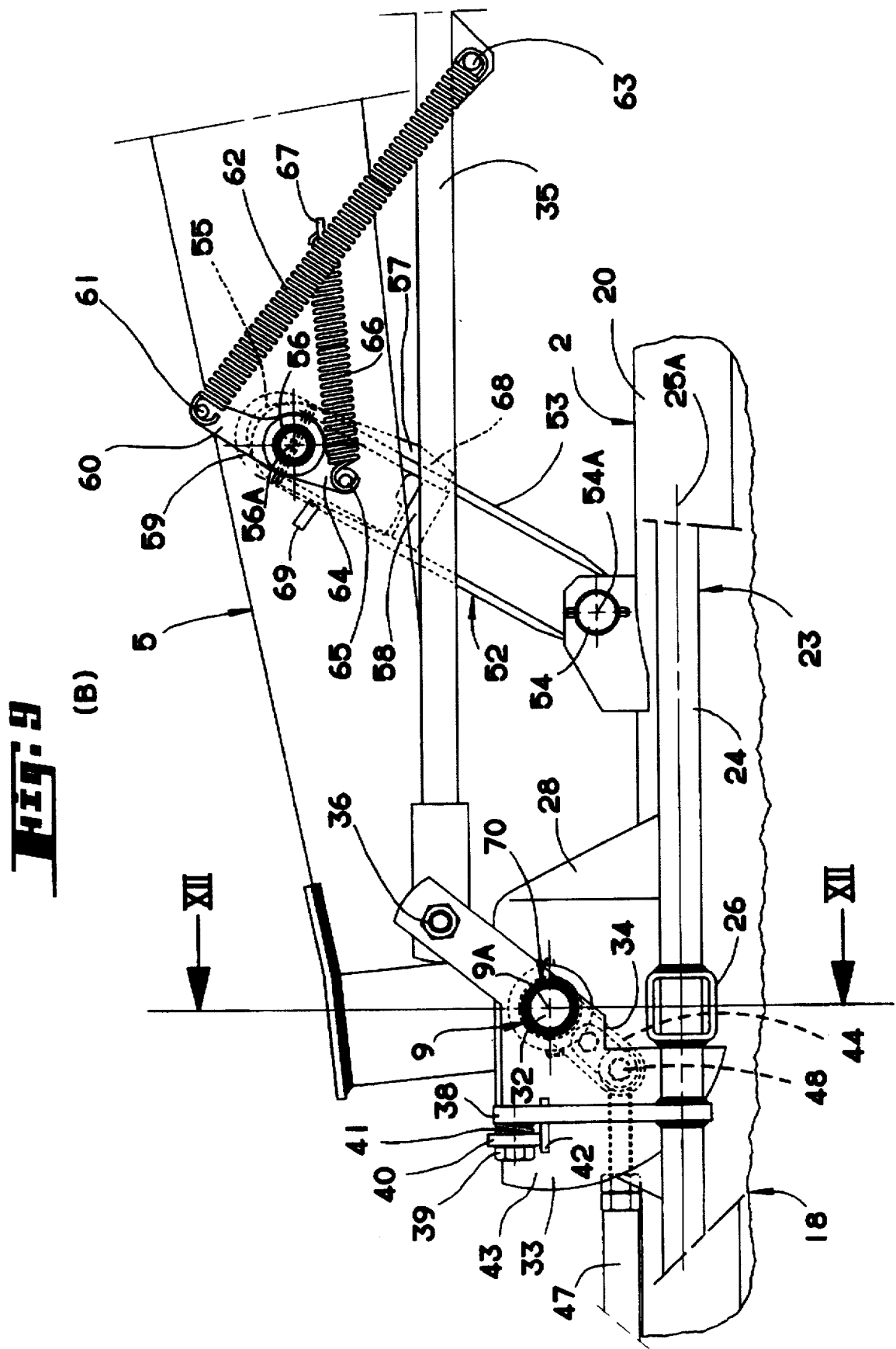
FIG. 9 represents, on a larger scale, a front view of the connection between the cutting mechanism and the support beam of the mower in transport position.
Figure 11:
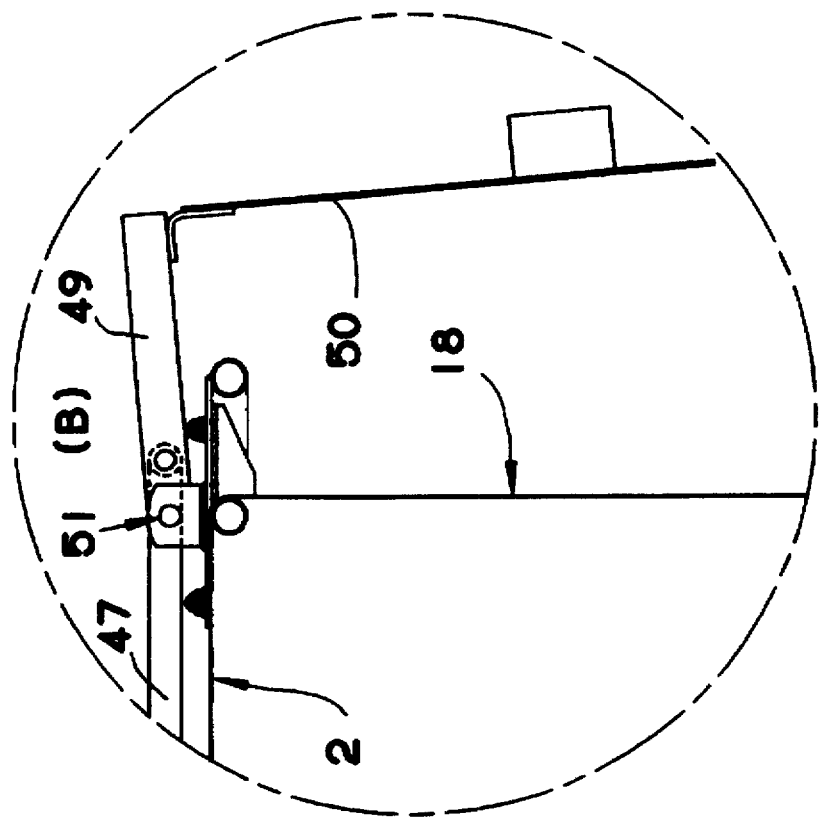
FIG. 11 represents, on a larger scale, area XI of FIG. 8.
Figure 10:
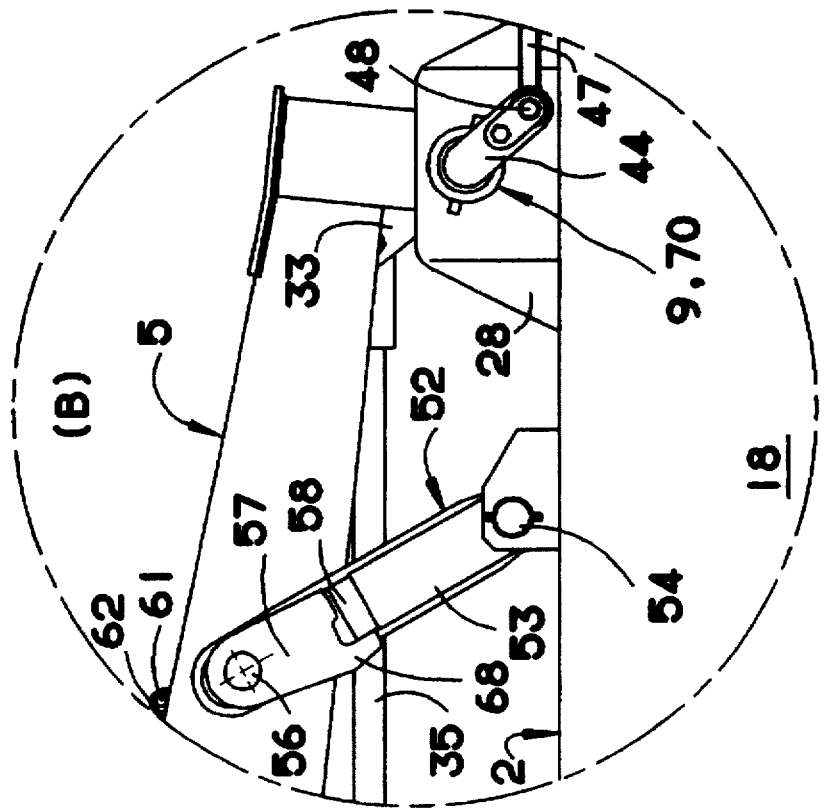
FIG. 10 represents, on a larger scale, area X of FIG. 8.

The stop (33) extends into the vicinity of the resting member (26) of said flap (24) and FIGS. 3 and 6 illustrates very clearly that the shape and the position of said stop (33) are such that the flap (24) cannot be pivoted upward about the pivot axis (25A) when the cutting mechanism (2) is in the working position (A). The pivoting of the flap (24) upward is possible only when the cutting mechanism (2) is located in the transport position (B) (FIGS. 9 and 12). The stop (33) is then pivoted in a suitable manner about the axis (9A) and a cut-out (34) is provided therein so that in this position the stop (33) can no longer prevent rotation of the resting member (26) when the flap (24) is pivoted upward.

Pivoting of the stop (33) in the locking position of the flap (24) (FIGS. 3 and 6), in the unlocking position of the flap (24) respectively (FIGS. 9 and 12) about the axis (9A) works automatically when the cutting mechanism (2) is put into its working position (A), or in its transport position (B) respectively by pivoting about the axis (11A). A rigid rod (35) is provided for this purpose, installed between the stop (33) and the attachment structure (3) to which said rod (35) is connected by means of a respective articulation (36, 37). The position of the articulation (37) which connects the rigid rod (35) to the attachment structure (3) is such that when the cutting mechanism (2) is placed in the work position (A), the stop (33) is pivoted into locking position of the flap (24); and when the cutting mechanism (2) is put in the transport position (B), the stop (33) is pivoted into unlocking position of the flap (24).

In proximity of the resting member (26), the flap (24) also includes a bracket (38). At its free end the bracket (38) is provided with a pivot (39) on which a hook (40) can pivot against the action of a spring (41) which presses said hook (40) against a wedge (42). By pivoting the flap (24) upward about the axis (25A), the hook (40) engages on to the stop (33) automatically. The stop (33) includes a projecting section (43) provided for that purpose. The flap (24) is then held in its non-operating position. In order to put the flap (24) back in its operating position it suffices to unhook the hook (40) and to pivot the flap (24) downward. But this hook (40) can also come unhooked automatically during pivoting of the cutting mechanism (2) from the transport position (B) into the work position (A). Indeed, it is clear that during this pivoting, the projecting section (43) of the stop (33) is withdrawn automatically from the hook (40) by separating from the latter downward. At that time the flap (24) can automatically return to its operating position due to the effect of its own weight. But it is also possible to assist this return by means of a helping element.

At the end opposite to that where the stop (33) is attached, the swivel pin (32) carries an arm (44) which is secured there by means of a pin (45). The arm (44) includes a flange (46) to which a second rigid rod (47) is articulated by means of a pivot (48). At its other end the second rigid rod (47) is articulated to a carrier arm (49) which carries a signalling plate (50). The carrier arm (49) is connected at the outside end of the fixed part of the framework (19) of the protection device (18) by means of an articulation (51) with axis (51A) at least approximately parallel to the axis (9A) of articulation (9). The length of the second rod (47) is advantageously adjustable in order to be able to position the signalling plate (50) in its operating position with precision.

One should also mention that the signalling plate (50) is found in operating position when the cutting mechanism (2) is in transport position (B) and that said signalling plate (50) is in non-operating position when the cutting mechanism (2) is in work position (A). One will understand that placing the signalling plate (50) in its operating position, or in its non-operating position respectively, is done automatically when the cutting mechanism (2) is brought into its transport position (B), or into its work position (A), respectively. Indeed, by being placed behind the cutting mechanism (2) and observing the latter during its pivoting from the work position (A) until the transport position (B), one will see that the first rod (35) pulls on the stop (33) and causes the latter to pivot together with the arm (44) about the axis (9A) in the counter-clockwise direction. By doing this the arm (44) pushes on the second rod (47) which causes the carrier arm

(49) to pivot together with the signalling plate (50) about the axis (51A) in the clockwise direction. In the operating position the signalling plate (50) extends at least approximately vertically at the rear end of the cutting mechanism (2) when the latter is in the transport position (B). This signalling plate (50) per se is conventional. One will understand that by pivoting the cutting mechanism (2) from its transport position (B) to its working position (A), the described mechanism will pivot the carrier arm (49) together with the signalling plate (50) into the non-operating position in which said signalling plate (50) extends above the cutting mechanism (2) and does not disturb operation of cutting.

As explained previously, the cutting mechanism (2) can, in work position (A), pivot with respect to the support beam (5) about the axis (9A). This pivoting is however limited by a limiting element (52) which acts between the support beam (5) and the cutting mechanism (2) or more precisely the support element (20) of the latter. Moreover, the limiting element (52) is also provided in order to lock pivoting of the cutting mechanism (2) about the axis (9A) when said cutting mechanism (2) is in the transport position (B).

The limiting element (52) includes a limiter (53) which is connected to the support element (20) by means of an articulation (54) with its axis (54A) extending at least approximately parallel to the axis (9A). At its end opposite the support beam (5), the limiter (53) includes an elongated opening (55). The latter is traversed by a swivel pin (56) with its longitudinal axis (56A) at least approximately parallel to the axis (9A) and guided in rotation in the support beam (5) about the longitudinal axis (56A). At its end, which extends beyond the elongated opening (55), the swivel pin (56) is provided with a lock (57) which is pinned there. The lock (57) is used to work together with an arresting device (58) provided on the limiter (53) at the base of the elongated opening (55). At its other end the swivel pin (56) is provided with a double lever (59). This double lever (59) includes a first arm (60) provided with a pin (61) to which a first spring (62) is connected. At the other end, the first spring (62) is connected to a pin (63) of the first rod (35). The double lever (59) also includes a second arm (64) provided with a pin (65) to which a second spring (66) is connected. At its other end the second spring (66) is connected to a pin (67) of the support beam (5).

One will understand that because of this limiting device, release of cutting mechanism pivoting about the axis (9A) and locking of said pivoting, respectively, are accomplished automatically when the cutting mechanism (2) is pivoted into work position (A) about the axis (11A), or when it is pivoted into transport position (B), respectively. Indeed, by being placed in front of the cutting mechanism (2) and by observing the latter during its pivoting from the work position (A) to the transport position (B), one will see that the rod (35) pulls the first spring (62) which acts on the double lever (59) which pivots in the clockwise direction about the longitudinal axis (56A) of the swivel pin (56). By doing this the lock (57) also pivots in the clockwise direction until it is opposite the arresting device (58) of the limiter (53), said pivoting being halted by a lug (68) of the lock (57) coming laterally to rest against the arresting device (58). The lock (57) is firmly held in that position by the first spring (62).

When in that position, the swivel pin (56) can no longer be moved into the elongated opening (55) or at least within the limit of the play provided for good operation of the mechanism. Pivoting the double lever (59) acts on the second spring (66). The energy which is thus stored by the second spring (66) will be used to cause pivoting of the double lever (59) and the lock (57) in the counter-clockwise direction when the cutting mechanism (2) is again pivoted into the work position (A). In the work position (A), the second spring (66) presses the double lever (59) against a wedge (69) which is integral with the support beam (5). Thus, the transmission of movement of the first rod (35) to the double lever (59) is accomplished by means of a spring, considering that the movements of said rod (35) and of the double lever (59) are not equal. It should also be noted that the articulation (9) is positioned in such a manner that by picking up the cutting mechanism (2) from the ground, the end of the latter located on the side of the limiting element (52) will move downward so that the swivel pin (56) is always located in the upper pan of the elongated opening (55).

In the example of the non-limiting embodiment which has just been described, the articulation (11) constitutes the first articulation;

the first rod (35) constitutes the first activation element;

the hook (40) constitutes the holding element;

the articulation (70) formed by the swivel pin (32) and the hollow shaft (30) constitutes the second articulation; its axis (70A) is coaxial with the axis (9A) of articulation (9);

articulation (9) constitutes the third articulation; its axis (9A) is directed at least approximately along the direction of work (8A) when the cutting mechanism (2) is in the work position (A);

the second rod (47) constitutes the second activation element;

the stop (33), the swivel pin (32) and the arm (44) constitute the coupling means which connects the second activation element to the first activation element;

the articulation (51) constitutes the fourth articulation;

the first tension spring (62), the second tension spring (66) and the double lever (59) constitute the third activation element;

the swivel pin (56) constitutes the fifth articulation.

Various modifications can be brought to the example which has just been described, especially with regard to the make-up of the various elements or by substitution of technical equivalents, without thereby departing from the scope of the invention. For example, the object of this invention can be applied to a mower which is different from that one which is the object of U.S. Pat. No. 5,566,537. The various activation elements could be hydraulic, pneumatic, etc. The drive elements of the cutting elements could have a different structure, the only condition being to not be able to ensure drive power of the cutting elements and, if necessary, of other work elements (elements used to treat the cut product for example) when the cutting mechanism is in the transport position or more generally in the position in which the moving part of the protection device can be moved. The cutting mechanism could be of any type whatsoever used for harvesting forage, for maintaining green spaces, for crushing vegetables, etc. It is even possible to attach to it some elements which are used to treat the cut product, such as conditioning elements, for example.

What is claimed as new and is desired to be secured by Letters Patent of the United States is:

1. An agricultural machine used for cutting vegetables and including:

an attachment structure adapted to be connected to a power driven vehicle, a cutting mechanism connected to the attachment structure by a first articulation so that said cutting mechanism can be brought into a work position in which it will extent transversely to a direction of travel, or into another position, said cutting mechanism including cutting elements and a protection device enveloping the latter and of which one part can be moved into a non-operating position, and drive elements which are capable of driving said cutting elements when said cutting mechanism is located in its work position and which are incapable of providing drive power for said cutting elements when said cutting mechanism is in the other position, wherein said agricultural machine additionally includes a stop device which has a first position which prevents movement of said one part of said protection device into the non-operating position when said cutting mechanism is located in the work position, said stop device having a second position which permits said movement of said one part of said protection device into the non-operating position when said cutting mechanism is located in the other position, an activation element for actuating said stop device from said second position to said first position automatically when said cutting mechanism is brought from said other position into the work position.

2. An agricultural machine used for cutting vegetables according to claim 1, characterized in that said activation element also automatically controls actuation of said stop device from said first position to said second position when said cutting mechanism is brought from the work position into the other position.

3. An agricultural machine used for cutting vegetables according to claim 1, characterized in that a holding element holds said one part of said protection device in its non-operating position, the action of said holding element being automatically released when said cutting mechanism is moved from the other position into the work position.

4. An agricultural machine used for cutting vegetables according to claim 3, characterized in that said holding element cooperates with the stop device when said cutting mechanism is located in the other position.

5. An agricultural machine used for cutting vegetables according to claim 1, characterized in that said activation element comprises a rod articulated between said attachment structure and said stop device.

6. An agricultural machine used for cutting vegetables in accordance with claim 1, characterized in that said stop device is connected directly or indirectly to said cutting mechanism and moves together with said cutting mechanism when the latter is moved between the work position and the other position.

7. An agricultural machine used for cutting vegetables in accordance with claim 6, characterized in that said stop device is connected directly or indirectly to said cutting mechanism by means of a second articulation with an axis.

8. An agricultural machine used for cutting vegetables in accordance with claim 7, characterized in that said axis of said second articulation is directed toward the front when said cutting mechanism is located in the work position.

9. An agricultural machine used for cutting vegetables according to claim 8, characterized in that said axis of said second articulation is directed at least approximately along the direction of travel when said cutting mechanism is located in the work position.

10. An agricultural machine used for cutting vegetables according to claim 7, characterized in that said cutting mechanism is connected to said attachment structure by a support beam which is attached on the one hand to said cutting mechanism by a third articulation with an axis directed toward the front when said cutting mechanism is located in the work position, and on the other hand to said attachment structure by said first articulation, said axis of said third articulation being coaxial with said axis of said second articulation.

11. An agricultural machine used for cutting vegetables according to claim 10, characterized in that said axis of said third articulation is directed at least approximately along the direction of travel when said cutting mechanism is located in the work position.

12. An agricultural machine used for cutting vegetables according to claim 1, characterized in that said part of said protection device which can be moved is a flap that can be pivoted about a pivot axis.

13. An agricultural machine used for cutting vegetables in accordance with claim 12, characterized in that said pivot axis about which said flap of the protection device can be pivoted, is, in the work position of the cutting mechanism, at least approximately horizontal and transverse to the direction of travel.

14. An agricultural machine used for cutting vegetables according to claim 13, characterized in that:

said stop device is connected directly or indirectly to said cutting mechanism by a second articulation with an axis, said pivot axis is at least approximately orthogonal to said axis of said second articulation.

15. An agricultural machine used for cutting vegetables according to claim 1, characterized in that said one part is located at the front of the protection device when the cutting mechanism is in the work position.

16. An agricultural machine used for cutting vegetables according to claim 1, characterized in that the other position which the cutting mechanism can occupy, is a transport position.

17. An agricultural machine used for cutting vegetables according to claim 16, characterized in that a signalling plate, which is connected directly or indirectly to said cutting mechanism, is moved automatically by means of a second activation element into an operating position when said cutting mechanism is placed in the transport position, and in a non-operating position in which it does not disturb the cutting of vegetables, when said cutting mechanism is placed in the work position.

18. An agricultural machine used for cutting vegetables in accordance with claim 17, characterized in that a coupling means connects said second activation element to the first activation element.

19. An agricultural machine used for cutting vegetables in accordance with claim 18, characterized in that:

said stop device is connected directly or indirectly to said cutting mechanism by a second articulation with an axis, said second articulation includes a swivel pin at one end of which there is attached said stop device and at the other end of which there is attached an arm, and said second activation element is comprised of a rod articulated between said arm and a carrier arm of said signalling plate.

20. An agricultural machine used for cutting vegetables according to claim 19, characterized in that the length of said rod is adjustable.

21. An agricultural machine used for cutting vegetables in accordance with claim 17, characterized in that said signalling plate is attached directly or indirectly to said cutting mechanism by a fourth articulation with an axis so as to be able to be placed in the operating position and in the non-operating position by pivoting about said axis of said fourth articulation.

22. An agricultural machine used for cutting vegetables in accordance with claim 21, characterized in that said axis of said fourth articulation is directed toward the front when the cutting mechanism is located in the work position.

23. An agricultural machine used for cutting of vegetables in accordance with claim 21, characterized in that:

said stop device is attached directly or indirectly to said cutting mechanism by a second articulation with an axis, said axis of said fourth articulation is at least approximately parallel to said axis of said second articulation.

24. An agricultural machine used for cutting vegetables in accordance with claim 17, characterized in that said axis of said first articulation is directed upward and that said signalling plate is provided at the outside end of said cutting mechanism away from said attachment structure.

25. An agricultural machine used for cutting vegetables in accordance with claim 1, characterized in that said cutting mechanism is connected to said attachment structure by a support beam connected on the one hand to said cutting mechanism by a third articulation with an axis directed toward the front when said cutting mechanism is located in the work position, and on the other hand to said attachment structure by said first articulation, a limiting element operating between said cutting mechanism and said support beam, limits pivoting of said cutting mechanism with respect to said support beam about the axis of said third articulation during operation, locks said cutting mechanism against pivoting with respect to said support beam at the time of transport, and unlocks said cutting mechanism for limited pivoting movement with respect to said support beam when said cutting mechanism is in the work position, the locking and unlocking, respectively, being implemented automatically by means of a third activation element when said cutting mechanism is moved into a transport position, or into the work position, respectively.

26. An agricultural machine used for cutting vegetables in accordance with claim 25, characterized in that said third activation element is connected to said first activation element.

27. An agricultural machine used for cutting vegetables in accordance with claim 25, characterized in that said limiting element includes a lock and a limiter provided with an elongated hole, said lock being attached to said support beam by a fifth articulation which comprises a swivel pin traversing simultaneously the elongated opening of said limiter.

28. An agricultural machine used for cutting vegetables in accordance with claim 27, characterized in that said fifth articulation has an axis which is at least approximately parallel to the direction of travel when the cutting mechanism is located in work position.

29. An agricultural machine used for cutting vegetables in accordance with claim 27, characterized in that said third activation element includes two elastically deformable elements of which one ensures activation of said lock into a locking position while the other ensures neutralization of the latter by moving said lock out of said locking position.

30. An agricultural machine used for cutting vegetables in accordance with claim 29, characterized in that the elastically deformable elements are comprised of tension springs.

* * * * *